United States Patent [19]
Blew et al.

[11] Patent Number: 5,469,523
[45] Date of Patent: Nov. 21, 1995

[54] COMPOSITE FIBER OPTIC AND ELECTRICAL CABLE AND ASSOCIATED FABRICATION METHOD

[75] Inventors: Douglas J. Blew; Bruce J. Carlson, both of Hickory, N.C.

[73] Assignee: CommScope, Inc., Catawba, N.C.

[21] Appl. No.: 258,328

[22] Filed: Jun. 10, 1994

[51] Int. Cl.⁶ ...................................... G02B 6/44
[52] U.S. Cl. .......................................... 385/101; 385/109
[58] Field of Search ...................................... 385/100–114

[56] References Cited

U.S. PATENT DOCUMENTS

| | | | |
|---|---|---|---|
| 1,216,337 | 2/1917 | McCulloch et al. | 174/112 |
| 2,186,788 | 1/1940 | Olson | 174/112 |
| 3,766,307 | 10/1973 | Andrews, Jr. | 385/101 |
| 4,237,337 | 12/1980 | Serrander | 174/10 |
| 4,420,220 | 12/1983 | Dean et al. | 385/111 |
| 4,423,306 | 12/1983 | Fox | 174/112 |
| 4,469,538 | 9/1984 | Wade et al. | 174/115 |
| 4,770,489 | 9/1988 | Saito et al. | 385/110 |
| 4,815,814 | 3/1989 | Ulijasz | 385/113 |
| 4,944,570 | 7/1990 | Oglesby et al. | 385/101 |
| 5,029,974 | 7/1991 | Nilsson | 385/113 |
| 5,109,457 | 4/1992 | Panuska et al. | 385/102 |
| 5,125,063 | 6/1992 | Panuska et al. | 385/113 |
| 5,138,685 | 8/1992 | Arroyo et al. | 385/113 |
| 5,150,443 | 9/1992 | Wijnberg | 385/107 |
| 5,189,718 | 2/1993 | Barrett et al. | 385/101 |

FOREIGN PATENT DOCUMENTS

| | | |
|---|---|---|
| 0040929 | 12/1981 | European Pat. Off. . |
| 332303 | 7/1930 | United Kingdom . |
| 355087 | 8/1931 | United Kingdom . |
| 474712 | 11/1931 | United Kingdom . |

*Primary Examiner*—Rodney B. Bovernick
*Assistant Examiner*—John Ngo
*Attorney, Agent, or Firm*—Bell, Seltzer, Park & Gibson

[57] ABSTRACT

A composite fiber optic and electrical cable having a core which loosely contains at least one optical fiber, a pair of copper clad steel electrical conductors having an outer polymer insulating layer, and a polymer jacket. The jacket is made of a polymer material having a melting temperature lower than the melting temperature of the insulating material of the electrical conductors. As a result, the polymer jacket does not bond with the insulating material during production of the cable. The jacket can thus be easily stripped from the electrical conductors during installation of the cable to facilitate the attachment of the electrical conductors to a signal repeater, or power source, or other electrical device. The cable is manufactured by advancing the core and electrical conductors through an extruder which forms the jacket around the core and electrical conductors. The core may be supplied from a storage reel or may be fabricated just prior to extruding the jacket around the buffer tube and electrical conductors, by extruding a buffer tube loosely around the optic fibers and then surrounding the buffer tube with a reinforcing layer.

36 Claims, 3 Drawing Sheets

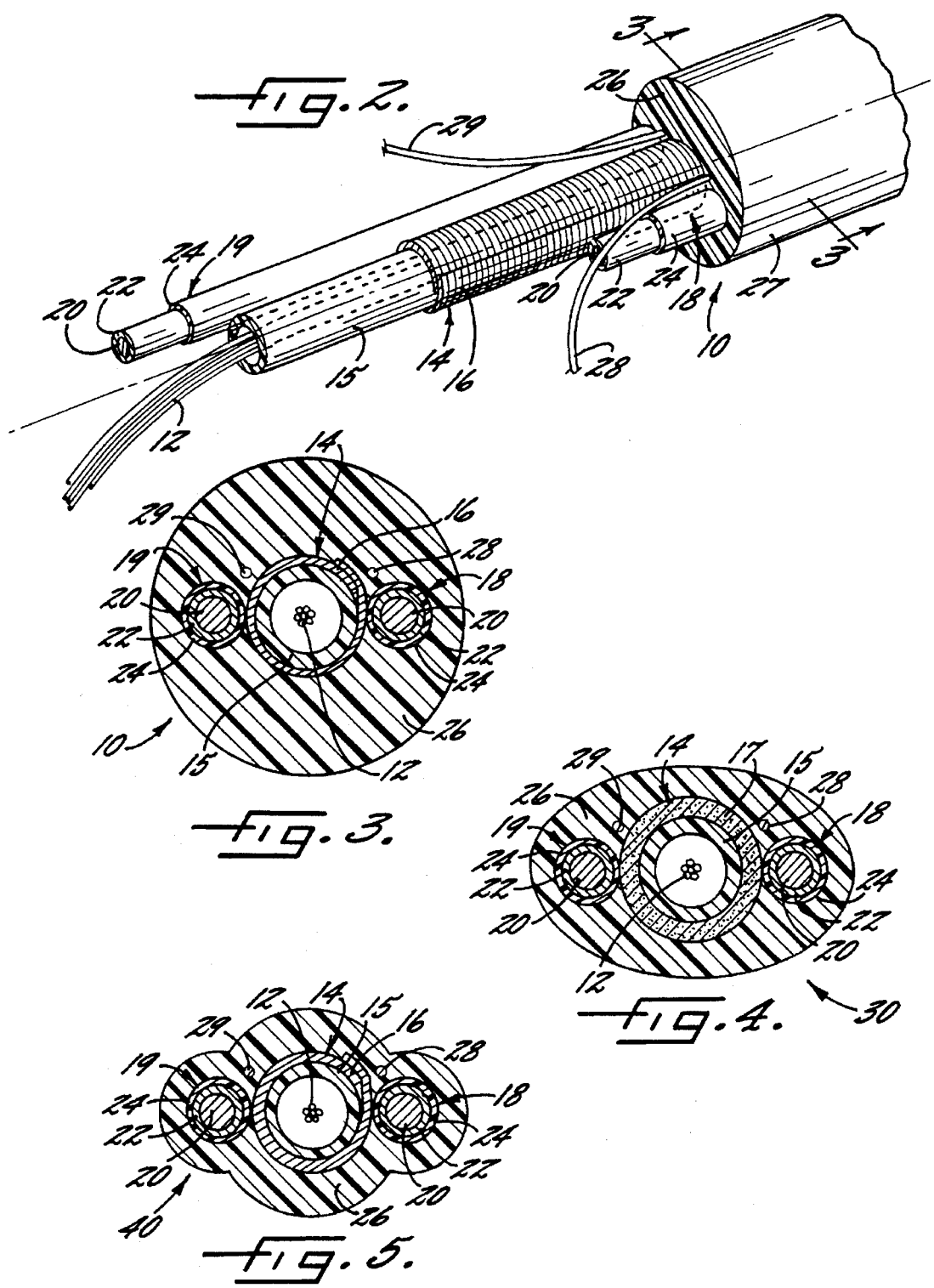

COMPOSITE FIBER OPTIC AND ELECTRICAL CABLE AND ASSOCIATED FABRICATION METHOD

FIELD OF THE INVENTION

This invention relates to the field of fiber optic communications systems, and more particularly, to a composite fiber optic and electrical cable with properties which facilitate separation of the electrical components from the cable, and associated methods.

BACKGROUND OF THE INVENTION

Fiber optic cables are widely used for transmitting telecommunications signals. It is common to produce fiber optic cables for transmitting such signals by surrounding one or more optical fibers within a loose fitting buffer tube in order to isolate the fibers from bending and tensile stresses imparted on the cable. It is also known that the cable may be strengthened by including one or more steel strength members within the cable. Several prior patents have proposed cables comprising a number of optical fibers disposed loosely within a buffer tube and having at least one strength member outside the buffer tube and incorporated within the cable. For example, Dean et al. U.S. Pat. No. 4,420,220, Nilsson U.S. Pat. No. 5,029,974, and Arroyo et al. U.S. Pat. No. 5,138,685 disclose such cables.

In circumstances where telecommunications signals are transmitted over long distances, signal repeaters are used to boost the effective transmission distance of the cable. These signal repeaters are typically powered by electrical current. In an emerging telecommunications architecture, fiber optic cables are replacing more traditional copper facilities. The local telephone company typically provides power to a subscriber's telephone via the pair of copper wires which also carry the telecommunications signals. Accordingly, it may be desirable to distribute electrical power over a fiber optic cable either directly to a subscriber or to other electronics remaining along a copper portion of the network.

It is known that fiber optic cables can be produced in conjunction with electrical conductors in order to supply power to signal repeaters or other electronics. The electrical conductors may also be used to carry communication messages themselves. Barrett et al. U.S. Pat. No. 5,189,718 discloses the use of electrical conductors in conjunction with the fiber optic cable wherein the electrical conductors are contained within a separate tube attached to the tube containing the optical fibers.

SUMMARY OF THE INVENTION

The present invention provides an improvement over the aforementioned cables by providing a composite fiber optic and electrical cable having a polymer jacket which is formed around a pair of electrical conductors and a core containing a number of optical fibers, wherein the jacket can be easily stripped from the electrical conductors in order to facilitate connecting the conductors between a power supply and a signal repeater or other electrical device. The electrical conductors also serve as strength members for the cable and resist tensile forces, as well as preventing buckling of the cable.

According to the present invention, the electrical conductors are surrounded by an outer insulating layer made of a polymer material. The jacket is made of a polymer material different than that of the insulating layer surrounding the conductors and has properties which enable the jacket to be stripped away from the insulating material. By stripping the jacket material away, the electrical conductors, surrounded by the insulating material, are exposed so that they may be connected to a signal repeater, or power source, or other electrical device. The fiber optic cable of the present invention may also include at least one rip-cord located within the polymer jacket to facilitate ripping of the jacket longitudinally in order to expose the electrical conductors.

The electrical conductors are wires which are surrounded by a layer of polymer insulating material. The insulating material may bear indicia for identifying the polarity of each wire. Likewise, the polymer jacket itself may also bear indicia on its outer surface to identify the polarity of the underlying electrical conductor. The core, comprising a buffer tube loosely surrounding the optic fibers, may have a reinforcing layer made of corrugated steel tape or aramid yarn surrounding the buffer tube.

The cable of the present invention may be produced by advancing a core containing one or more optical fibers from a storage reel along a path of travel through a jacket extruder. Two electrical conductors, surrounded by insulating material, and rip cords are also advanced along a path of travel through the jacket extruder. The jacket extruder forms a polymer jacket surrounding the core, the electrical conductors and the rip cords. Alternatively, the entire cable may be produced in-line by advancing a number of optical fibers through a buffer tube extruder which forms a loosely fitting buffer tube around the fibers and applying a reinforcing layer to the buffer tube to form a core, just prior to advancing the core through the jacket extruder with the electrical conductors and rip cords.

BRIEF DESCRIPTION OF THE DRAWINGS

Some of the features and advantages of the invention having been described, others will become apparent from the detailed description which follows, and from the accompanying drawings in which:

FIG. 2 is a perspective cross-sectional view of a composite fiber optic and electrical cable of the present invention;

FIG. 3 is a transverse cross-sectional view of the cable taken substantially along the lines 3—3 in FIG. 2;

FIG. 4 is a transverse cross-sectional view of an alternate embodiment of a composite fiber optic and electrical cable according to the present invention;

FIG. 5 is a transverse cross-sectional view of still another alternative embodiment of a composite fiber optic and electrical cable according to the present invention.

DETAILED DESCRIPTION OF THE ILLUSTRATED EMBODIMENTS

The present invention will be described more fully hereinafter with reference to the accompanying drawings, in which preferred embodiments of the invention are shown. This invention may, however, be embodied in many different forms and should not be construed as limited to the embodiments set forth herein. Rather, applicants provide these embodiments so that this disclosure will be thorough and complete, and will fully convey the scope of the invention to those skilled in the art. Like numbers refer to like elements throughout.

Figure 1A:
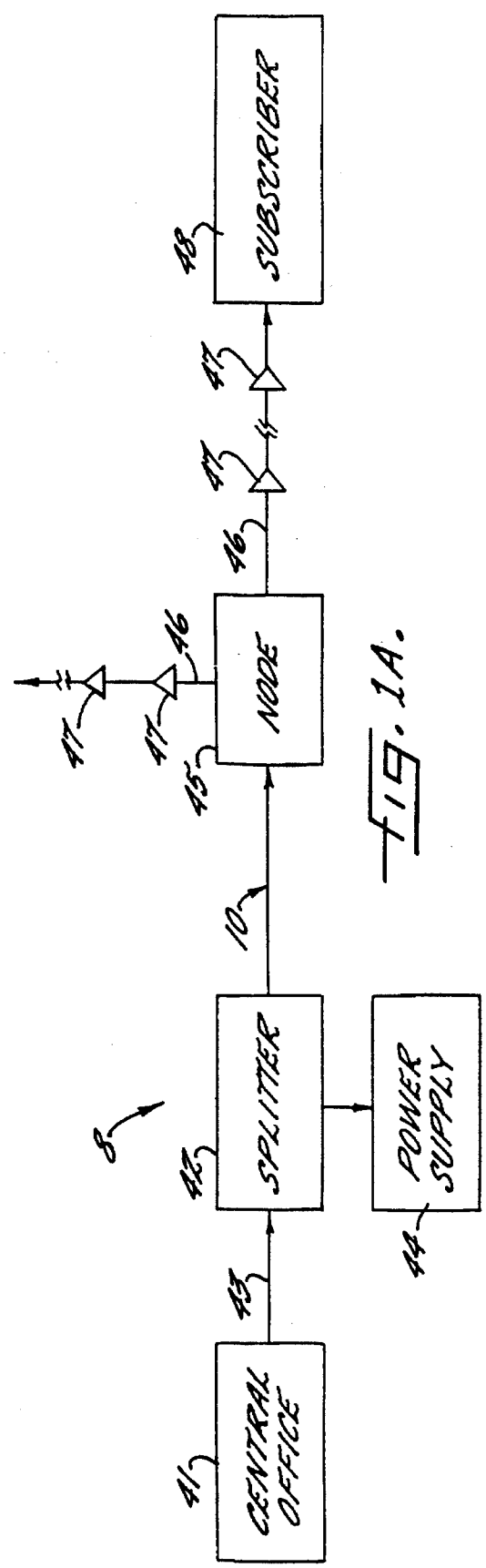
FIG. 1A is a schematic diagram of the composite fiber optic and electrical cable according to the invention used in a first telecommunications network architecture.
Figure 1B:
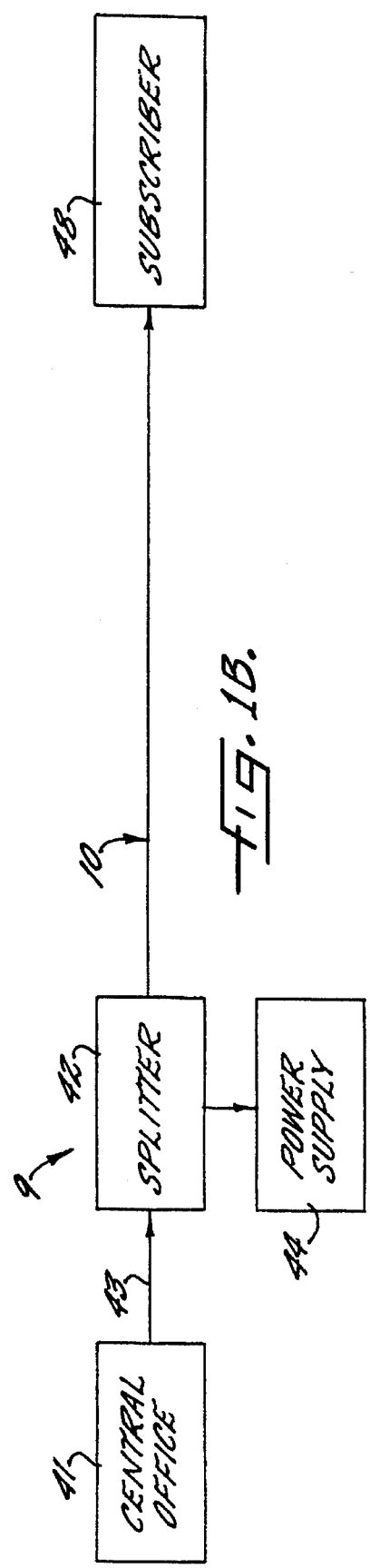
FIG. 1B is a schematic diagram of the composite fiber optic and electrical cable according to the invention used in a second telecommunications network architecture.

A first embodiment of the composite optical and electrical cable of the present invention is indicated generally in FIGS. 1A–3 by the reference character 10. The cable 10 may be used in many applications requiring the distribution of electrical power along with the transmission of optical signals. For example, as shown in FIG. 1A, the composite cable 10 may be used in an architecture or telecommunications system 8 including a central office 41 connected to a splitter 42 by a fiber optic trunk cable 43. A power supply 44 at the splitter location provides power to the composite cable 10 to distribute electrical power to and along coaxial cables 46 to one or more signal repeaters 47. Power may also be desirably delivered to the subscriber 48. As shown in the alternate telecommunications system 9 of FIG. 1B, fiber in the composite cable 10 may be connected at one end to a power supply 44 and at the other end directly to the subscriber 48. The other elements of FIG. 1B are similar to those of FIG. 1A and, hence, need no further description.

As would be readily understood by those skilled in the art, the power supply 44 may typically be a relatively expensive and somewhat large package of electronics. The power supply 44 also typically requires a controlled environment. Accordingly, co-locating the power supply 44 at the location of the splitter 42 greatly facilitates the distribution of electrical power to the nodes 45, amplifiers 47, and/or subscribers 48. The composite fiber and electrical cable 10 according to the invention permits co-locating the power supply 44 at the location of the splitter 42.

As seen in FIGS. 2 and 3, the cable 10 includes a number of optical fibers 12 surrounded by a loosely fitting core 14. Preferably, the number of optical fibers 12 within the core 14 is twelve or less. The core 14 comprises an inner polymer buffer tube 15 and an outer layer of corrugated steel tape 16 which provides improved protection for the fibers against damage by rodents. Alternatively, as seen in FIG. 4, the core 14 may have an outer aramid layer 17 which provides additional strength to the core 14 thereby protecting the fibers 12 from tensile stresses. In other embodiments, the core 14 may have no reinforcing layer at all and comprise only the polymer buffer tube 15.

As shown in the illustrated embodiment, on diametrically opposite sides of the core 14 are two electrically conductive wires 18 and 19. While the wires 18 and 19 are shown on diametrically opposite sides of the core 14, those skilled in the art will recognize that the wires 18 and 19 may be disposed, in other embodiments, adjacent the core 14 and not on diametrically opposite sides of the core 14. However, placement of the electrically conductive wires 18 and 19 on opposite sides of the core 14 may provide improved handling characteristics for the cable 10, while still providing sufficient tensile strength and resistance to buckling.

In the illustrated embodiment, the electrically conductive wires 18 and 19 include a steel center or core 20 and a surrounding layer of copper cladding 22. The steel center serves to strengthen the cable longitudinally and to stiffen the cable, thus further reducing bending stresses imparted upon the fibers 12. The copper cladding 22 serves to increase the wire's electrical conductivity. Each of the wires are of a relatively large gauge, such as 12 gauge, and are capable of delivering conventional powering voltages along the cable route, such as, for example, 60 VAC, 85 VDC, 130 VAC, or 135 VDC. Other powering voltages are also contemplated by the invention.

The wires 18 and 19 are surrounded by an outer layer of insulation 24. As shown, the outer diameter of the insulating layer 24 surrounding the wires 18 and 19 is preferably less than the overall outside diameter of the core 14. The insulation layer 24 is made of a polymer material such as polyethylene, nylon or other materials, as would be readily understood by those skilled in the art. The insulating layer surrounding each wire 18 and 19 may also preferably have colors or markings different from one another in order to indicate the polarity of each wire. However, one skilled in the art will recognize that the insulating layer 24 surrounding the wires 18 and 19 may be of the same color and bear no indicia.

The core 14 and insulation layer 24 surrounding the wires 18 and 19 are in turn surrounded by a jacket 26 having a substantially circular transverse cross-section. The jacket 26 is made of a polymer material having properties which enable it to be readily separated from the insulation 24 which surrounds wires 18 and 19. To this end, the polymer material of the jacket 26 preferably forms a distinct separate phase from the polymer material for the insulation layer 24. This is accomplished by appropriate selection of the composition of the insulation layer 24 and the jacket 26, such as by selecting a polymer material for the jacket which has a melting temperature which is lower than the melting temperature of the insulation layers. For example, if the jacket is made of polyethylene, the insulation layers 24 may be made of a higher-melting grade of polyethylene, a nylon, or a polyester such as polyethylene terephthalate (PET) or polybutylene terephthalate (PBT). Because the jacket 26 has a lower melting temperature than the insulation layers 24, the insulation does not melt or bond with the jacket 26 when the jacket is formed around the insulation. The resultant jacket 26 can therefore be readily stripped away from the insulation layers 24 during installation of the cable 10, thereby exposing the wires 18 and 19 so that they may be connected to a power supply 44 (FIGS. 1A and 1B) or other electrical device. As shown in FIG. 2, in a preferred embodiment, the jacket 26 bears markings, such as a contrasting stripe 27, on its outer surface for indicating the polarity of the underlying wires 18 and 19. However, one skilled in the art will recognize that the jacket 26 may have no markings indicating polarity of the underlying wires 18 and 19.

The composite optical and electrical cable 10 of the present invention may include a pair of rip cords 28 and 29 disposed longitudinally within the jacket 26. The first rip cord 28 is located along a longitudinal line adjacent both the core 14 and the insulation layer 24 surrounding the first wire 18. The second rip cord 29 is located along a longitudinal line adjacent both the core 14 and the insulation layer 24 surrounding the second wire 19. The rip cords 28 and 29, when pulled back from a cut end of the cable 10, will rip the jacket 26 longitudinally to expose the core 14 and the insulation 24 surrounding wires 18 and 19, thereby enabling a field technician to connect the wires 18 and 19 to a power supply 44 or other device requiring power. One skilled in the art will recognize that the cable 10 of the present invention may have only one rip-cord or no rip-cords, and that the rip-cords may be disposed within the jacket 26 at positions other than those described.

Another embodiment of the composite optical and electrical cable 30 of the present invention is illustrated in FIG. 4 which shows the composite optical and electrical cable having a substantially elliptical transverse cross-section.

Again, the cable includes a number of optical fibers 12 surrounded loosely by a core 14. The core 14 includes an inner polymer buffer tube 15 and an outer reinforcing layer of aramid yarn 17. Like the embodiment of FIGS. 2 and 3, the core 14 may alternatively have a reinforcing layer of corrugated steel tape 16, or the core may have no reinforcing layer and comprise only a polymer buffer tube 15. The cable 30 also includes two wires 18 and 19 located on diametrically opposite sides of the core 14 and with their centers located along the major axis of the cable's elliptical cross-section. The wires 18 and 19 are each surrounded by an insulating layer 24 which has an overall outside diameter which in the illustrated embodiment is less than that of the core 14. The core 14 is centered at the intersection of the major axis and the minor axis of the elliptical cross-section of the cable 30.

The cable 30 includes two rip cords 28 and 29. Again, the first rip cord 28 is located along a longitudinal line adjacent the core 14 and the insulation layer 24 surrounding the first wire 18, and the second rip cord 29 is located along a longitudinal line adjacent the core 14 and the insulation layer 24 surrounding the second wire 19. The insulation layer 24 surrounding the electrical conductors 18 and 19 may have indicia for indicating polarity of the conductors, and the jacket 26 may also have indicia on its outer surface for indicating polarity of an underlying electrical conductor.

Another embodiment of the composite optical and electrical cable of the present invention is shown in FIG. 5 and indicated generally by reference numeral 40. In this embodiment, the insulation layers 24 surrounding wires 18 and 19 again have an overall outside diameter less than that of the core 14 and are located on diametrically opposite sides of the core 14. The jacket 26, which surrounds the core 14 and the insulation layers 24 surrounding the wires 18 and 19, have a thickness which is consistent about the transverse perimeter of the cable 40, thus causing the cable 40 to have a transverse cross-sectional configuration which is trilobal.

As with the previously described embodiments, the cable 40 embodiment illustrated by FIG. 5 includes two rip cords 28 and 29 disposed longitudinally within the cable and adjacent the core 14 and the insulation layers 24 surrounding the electrical conductors 18 and 19. Also, the insulation layers 24 surrounding the electrical conductors 18 and 19 may have indicia for indicating polarity of the electrical conductors, and the jacket 26 may have indicia on its outer surface for indicating polarity of the underlying conductors.

Figure 6:
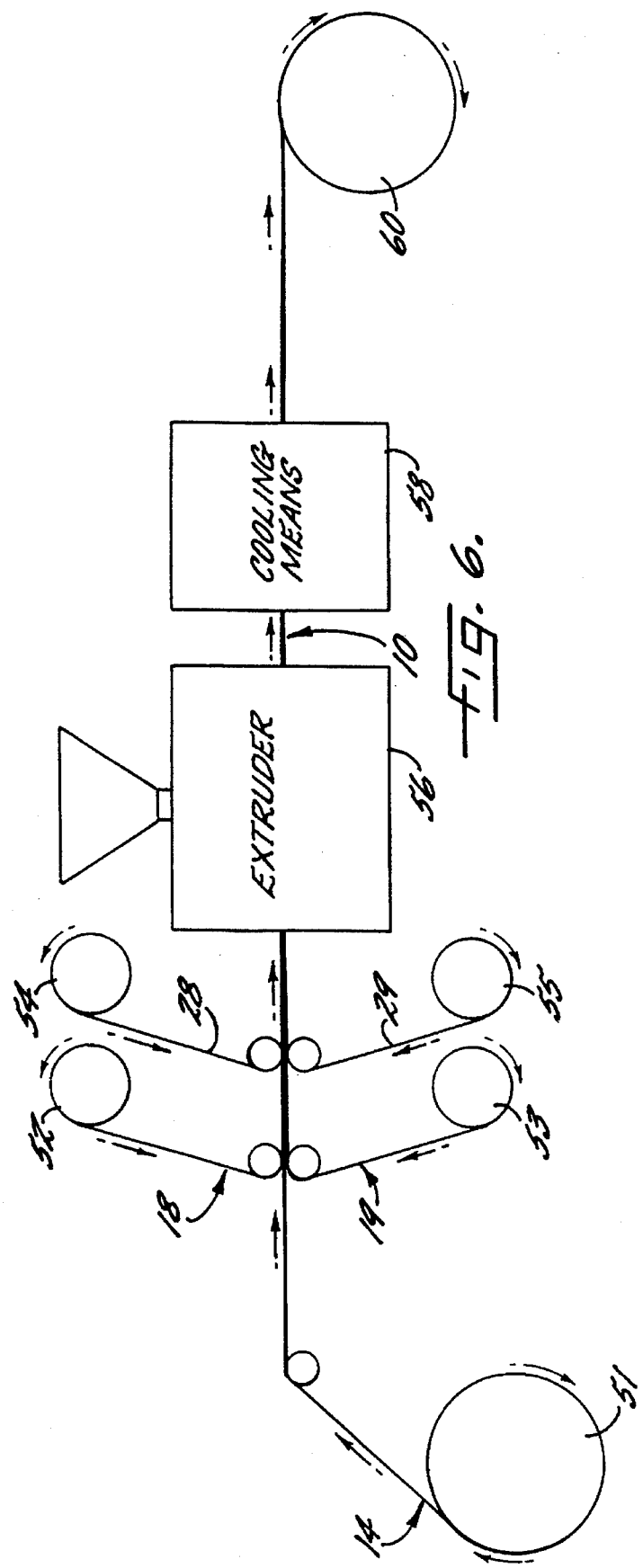
FIG. 6 is a schematic view illustrating a manufacturing line for making composite optical and electrical cables of the present invention.

A preferred method of producing the composite fiber optic and electrical cable of the present invention is illustrated schematically in FIG. 6. According to this method, a core 14 is provided on a storage reel 51, and is advanced from the storage reel along a path of travel through a jacket extruder 56. Two electrical conductors 18 and 19, comprising an inner steel center with copper cladding, and being surrounded by an outer layer of polymer insulating material, are advanced from storage reels 52 and 53 along a path of travel through the jacket extruder 56 adjacent the core 14 and on diametrically opposite sides of the core 14. Two rip cords 28 and 29 are advanced from storage reels 54 and 55 along a path of travel through the jacket extruder 56 adjacent the core 14 and the electrical conductors 18 and 19.

The jacket extruder 56 forms a molten polymer jacket surrounding the core 14, the electrical conductors 18 and 19 and rip cords 28 and 29 thereby forming a cable 10. The jacket formed by the jacket extruder 56 may have a transverse cross-section that is circular, elliptical or trilobal. Also, according to this method, the insulating material of the electrical conductors 18 and 19 may bear indicia for indicating a polarity of the electrical conductors, and the jacket may have indicia placed on its outer surface for indicating a polarity of an underlying electrical conductor.

The molten polymer extruded by the jacket extruder 56 has a melting temperature which is lower than the melting temperature of the polymer insulating material surrounding the electrical conductors 18 and 19. Thus, the insulating material does not melt upon contacting the molten jacket material in the jacket extruder 56, and it does not bond to the jacket material when the jacket material cools and solidifies.

After the jacket has been extruded around the core, electrical conductors and rip cords, the cable 10 is advanced through a cooling unit 58 and is then wound about a take-up reel 60. One skilled in the art will recognize that instead of being wound about a take-up reel, the cable may continue along the path of travel for further processing. As would be readily appreciated by those skilled in the art, the copper cladding may also be applied to the steel core of each electrical power conductor in-line with the overall cable making process.

In another preferred method of producing the composite fiber optic and electrical cable of the present invention, a number of optical fibers, preferably twelve or less, are provided from fiber payoffs and advanced along a path of travel to a first extruder which extrudes a loose fitting buffer tube around the fibers. A reinforcing layer of corrugated steel tape or aramid yarn may then be applied to the buffer tube to form a core. The core is then advanced through the jacket extruder 56 along with the electrical conductors 18 and 19 and rip-cords 28 and 29, as set forth above. Again, after being cooled, the cable is wound about a take-up reel or may continue on the path of travel for further processing.

In the drawings and specification, there has been set forth preferred embodiments of the invention, and although specific terms are employed, they are used in a generic and descriptive sense only and not for purposes of limitation.

What is claimed is:

1. A composite fiber optic and electrical cable comprising:
   an elongate core,
   at least one optical fiber extending longitudinally within said core,
   a pair of electrical power conductors extending longitudinally of and alongside said core,
   an insulating layer of a first polymer material surrounding each of said electrical power conductors, and
   an outer jacket of a second polymer material surrounding said core and surrounding and encasing said electrical power conductors and their respective insulating layers and having properties enabling said outer jacket to be separated from said insulating layers, wherein said second polymer material is of a composition which forms a distinct mechanical separate phase from said first polymer material.

2. A composite fiber optic and electrical cable according to claim 1 wherein said second polymer material has a melting temperature lower than the melting temperature of said first polymer material.

3. A composite fiber optic and electrical cable according to claim 2 wherein said first polymer material is polyester and said second polymer material is polyethylene.

4. A composite fiber optic and electrical cable according to claim 1 wherein said electrical power conductors each comprise a conductor core and an electrically conductive outer layer of greater conductivity than said conductor core.

5. A composite fiber optic and electrical cable according to claim 4 wherein said conductor core is made of steel and said outer layer is made of copper.

6. A composite fiber optic and electrical cable according to claim 1 wherein said core comprises at least one buffer tube and a reinforcing layer surrounding said at least one buffer tube.

7. A composite fiber optic and electrical cable according to claim 6 wherein said reinforcing layer is made of corrugated steel tape.

8. A composite fiber optic and electrical cable according to claim 6 wherein said reinforcing layer is made of aramid material.

9. A composite fiber optic and electrical cable according to claim 1 wherein said electrical power conductors are located on diametrically opposite sides of said core.

10. A composite fiber optic and electrical cable according to claim 9 wherein a transverse cross-section of said cable is substantially circular.

11. A composite fiber optic and electrical cable according to claim 9 wherein said insulating layer surrounding each of said electrical power conductors has an overall outside diameter less than that of said core.

12. A composite fiber optic and electrical cable according to claim 11 wherein a transverse cross-section of said cable is substantially elliptical.

13. A composite fiber optic and electrical cable according to claim 11 wherein a transverse cross section of said cable is substantially trilobal.

14. A composite fiber optic and electrical cable according to claim 9 further comprising at least one rip-cord extending longitudinally of said cable within said outer jacket, and wherein said at least one rip-cord is adapted to facilitate removal of said outer jacket from said insulation layer.

15. A composite fiber optic and electrical cable according to claim 14 wherein said at least one rip-cord includes a first rip-cord disposed adjacent said core and said insulating layer surrounding a first electrical power conductor, and a second rip-cord disposed adjacent to said core and said insulating layer surrounding a second electrical power conductor.

16. A composite fiber optic and electrical cable according to claim 1 wherein at least one of said insulating layers bears indicia for indicating polarity of the electrical power conductors.

17. A composite fiber optic and electrical cable according to claim 1 further comprising marking indicia on the outer surface of said outer jacket for indicating polarity of an electrical power conductor located within said cable in close proximity to said marking indicia.

18. A composite fiber optic and electrical cable comprising:

at least one optical fiber, an elongate buffer tube loosely surrounding said at least one optical fiber, a reinforcing layer surrounding said buffer tube thereby forming a core with said buffer tube, a pair of electrical power conductors extending longitudinally of and alongside said core disposed on diametrically opposite sides of said core, an insulating layer of a first polymer material individually surrounding each of said electrical power conductors, an outer jacket of a second polymer material surrounding said core and surrounding said electrical power conductors and their respective insulating layers, said second polymer material having a melting temperature lower than the melting temperature of said first polymer material, and said second polymer material forming a distinct separate phase from said first polymer material, and at least one rip-cord extending longitudinally of said cable within said outer jacket and disposed adjacent one of said electrical power conductors to facilitate separation of said outer jacket from said cable.

19. A composite fiber optic and electrical cable according to claim 18 wherein said insulating layer surrounding each of said electrical power conductors has an overall outside diameter less than that of said core.

20. A composite fiber optic and electrical cable according to claim 18 wherein said electrical power conductors each comprise a conductor core and an electrically conductive outer layer of greater conductivity than said conductor core.

21. A composite fiber optic and electrical cable according to claim 20 wherein said conductor core is made of steel and said outer layer is made of copper.

22. A composite fiber optic and electrical cable according to claim 18 wherein said first polymer material is polyester and said second polymer material is polyethylene.

23. A composite fiber optic and electrical cable comprising:

at least one optical fiber, an elongate buffer tube loosely surrounding said at least one optical fiber, a reinforcing layer surrounding said buffer tube thereby forming a core with said buffer tube, a pair of electrical power conductors extending longitudinally of and alongside said core disposed on diametrically opposite sides of said core, each of said electrical power conductors comprising a conductor core and an electrically conductive outer layer of greater conductivity than said conductor core, an insulating layer of a first polymer material individually surrounding each of said electrical power conductors, and an outer jacket of a second polymer material surrounding said core and surrounding said electrical power conductors and their respective insulating layers, said second polymer material having a melting temperature lower than the melting temperature of said first polymer material, and said second polymer material forming a distinct separate phase from said first polymer material.

24. A composite fiber optic and electrical cable according to claim 23 wherein said insulating layer surrounding each of said electrical power conductors has an overall outside diameter less than that of said core.

25. A composite fiber optic and electrical cable according to claim 23 wherein said conductor core is made of steel and said outer layer is made of copper.

26. A composite fiber optic and electrical cable according to claim 23 wherein said first polymer material is polyester and said second polymer material is polyethylene.

27. A method of producing a composite fiber optic and electrical cable comprising:

advancing a core, containing within it at least one optical fiber, along a path of travel, advancing a pair of power conductors, each surrounded by an insulating layer made of a first polymer material, along a path of travel adjacent to said path of travel of the core, and extruding an outer jacket around said core and said power conductors such that the outer jacket surrounds and encases each of said power conductors, wherein the outer jacket is made of a second polymer material having properties enabling said outer jacket to be separated from said insulating layers, and wherein the second polymer material is of a composition which forms a distinct mechanical separate phase from the first polymer material.

28. A method according to claim 27 wherein said step of surrounding the core and the power conductors with an outer jacket made of a second polymer material comprises extruding the outer jacket from a second polymer material with a melting temperature which is lower than the melting temperature of the first polymer material.

29. A method according to claim 27 wherein said step of advancing a pair of power conductors further comprises directing the pair of power conductors on diametrically opposite sides of the core.

30. A method according to claim 27 further comprising the steps of advancing at least one rip-cord along a path of travel adjacent to the paths of travel of the core and the power conductors, and wherein said step of surrounding said core and said power conductors with an outer jacket also includes surrounding said at least one rip-cord with said second polymer material along with the core and the power conductors.

31. A method according to claim 30 wherein said step of advancing at least on rip-cord along a path of travel comprises advancing two rip cords.

32. A method according to claim 27 wherein said step of surrounding the core and the power conductors with a polymer material outer jacket further comprises placing marking indicia on the outer surface of said outer jacket at a location in close proximity to one of said electrical conductors to indicate a polarity of the electrical conductor.

33. A method according to claim 27 further comprising, prior to the step of advancing said core along a path of travel, the steps of:

advancing at least one optical fiber along a path of travel, and forming a loosely fitting core around the fiber or fibers.

34. A method according to claim 33 wherein said step of forming a loosely fitting core around the fiber or fibers comprises extruding a buffer tube.

35. A method according to claim 34 wherein said step of forming a loosely fitting core further comprises applying an outer reinforcing layer to the buffer tube.

36. A method of producing a composite fiber optic and electrical cable comprising:

advancing at least one optical fiber along a path of travel, extruding a loosely fitting buffer tube around the fiber or fibers, applying a layer of reinforcing material to the outer surface of said buffer tube to form a core, advancing a pair of power conductors along two paths of travel alongside the core and on diametrically opposite sides of said core, each power conductor being surrounded by an insulating layer made of a first polymer material, advancing at least one rip-cord along a path of travel adjacent to the path of travel of the core, and extruding an outer jacket around said core, said power conductors and said at least one rip cord, said outer jacket being made of a second polymer material having a melting temperature lower than the melting temperature of said first polymer material.

* * * * *